United States Patent [19]

Munz et al.

[11] Patent Number: 4,847,160
[45] Date of Patent: Jul. 11, 1989

[54] WINDSHIELD MADE OF GLASS HAVING AN ANTI-FOGGING EFFECT WITH RESPECT TO OILY ORGANIC SUBSTANCES

[75] Inventors: Rudolf Munz, Böblingen; Peter Kurzmann, Gärtringen; Ute Faas, Wildbad, all of Fed. Rep. of Germany

[73] Assignee: Daimler-Benz Aktiengesellschaft, Stuttgart, Fed. Rep. of Germany

[21] Appl. No.: 162,100

[22] Filed: Feb. 29, 1988

[30] Foreign Application Priority Data

Mar. 3, 1987 [DE] Fed. Rep. of Germany ....... 3706782

[51] Int. Cl.$^4$ ............................ B05D 5/06; B32B 9/04
[52] U.S. Cl. ..................................... 428/447; 65/60.3; 427/163; 427/165
[58] Field of Search ............... 427/384, 387, 163, 164, 427/165; 428/429, 447; 65/60.3

[56] References Cited

U.S. PATENT DOCUMENTS

| | | | |
|---|---|---|---|
| 3,468,751 | 9/1969 | Tesoro | 428/419 |
| 4,112,171 | 9/1978 | Motter et al. | 427/164 X |
| 4,235,654 | 11/1980 | Dohi et al. | 65/60.3 X |
| 4,711,820 | 12/1987 | Arkles et al. | 428/429 |

FOREIGN PATENT DOCUMENTS 2426698 12/1975 Fed. Rep. of Germany.

OTHER PUBLICATIONS

Edwin P. Plueddemann, "Silane Coupling Agents", 1982, pp. 94–97, 142–143.

*Primary Examiner*—Michael Lusignan
*Attorney, Agent, or Firm*—Barnes & Thornburg

[57] ABSTRACT

A windshield is provided having a glass surface which includes silicon atoms bonded to a silicon-organic group via oxygen atoms. The windshield exhibits anti-fogging properties. A method of treating windshields having a glass surface with a silicon-organic group is also provided for impacting anti-fogging properties to the windshield.

9 Claims, No Drawings

WINDSHIELD MADE OF GLASS HAVING AN ANTI-FOGGING EFFECT WITH RESPECT TO OILY ORGANIC SUBSTANCES

BACKGROUND AND SUMMARY OF THE INVENTION

The invention relates to a windshield which prevents fogging and to a method of treating a windsheild to prevent fogging.

Fogging is a clouding of windshields of vehicles that is not caused by water vapor condensation, but is a result of the precipitation of droplets of an oily organic material on the inside of the windshield. This condensation of organic material on the windshield is caused by vapors of organic material that are released by the plastic parts (such as softeners) or by the textile materials (such as brightening agents) of the passenger compartment. Particularly in the summer, when the passenger compartment is heated extensively by the sun, fogging has a particularly annoying effect.

It is an object of the present invention to provide a windshield made of glass having an anti-fogging effect. A further object of the present invention is to provide compounds for a method of treating vehicle windows in order to achieve an anti-fogging effect.

These objects are achieved by providing a window including silicon-organic groups of the following formulas that, via oxygen atoms, are bonded to the silicon atoms of the window surface:

where $b=0$ or $1$; $c=1$ or $2$; and $b+c=1$ or $2$;
$R^3$ is a group of the formula

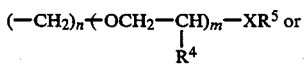

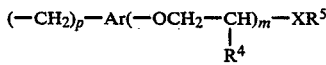

where $m=0$ to $30$; $n=1$ to $8$; $p=0$ to $9$;
$R^4$ is H, $CH_3$ or $CH_2OH$;
X is O, NH,

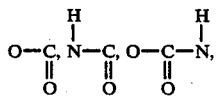

or S; and
$R^5$ is an alkyl group with up to 18 carbon atoms (C-atoms); and alkenyl group with up to 18 C-atoms; a hydroaxyl group with up to 18 C-atoms; an aryl group or H; or $XR^5$ is a cyanide or an imidazoline group, and if $XR^5=SH$ and $m=0$, then $n=1$ to 3 and if $XR^5=NH_2$ and $m=0$, then $n=1$ to 6.

According to other advantageous features of certain preferred embodiment of the invention, the silicon-organic groups of the following general formula are bonded to the glass surface silicon atoms:
$Si(-CH_2)_n-XR^5$, wherein $n=2$ or $3$ and $XR^5=CN$, $NH_2$ or OH. In certain preferred embodiments, the silicon-organic groups have the formulas $SiCH_2CH_2CN$ or $SiCH_2CH_2CH_2OH$.

According to other advantageous features of certain preferred embodiments of the invention, the silicon-organic groups have one of the following formulas:

$SiCH_2CH_2CH_2OCH_2CH(OH)CH_2OH$, $SiCH_2CH_2CH_2NH_2$, $SiCH_2CH_2CH_2OH$ or
$SiCH_2CH_2CH_2-OCH_2-CH_2OH$.

For achieving the object of providing a method for the treatment of windshields to achieve an anti-fogging effect, compounds of the followig formula are contacted to the glass surface in an amount effective to impart fog resistant properties to the windshields:

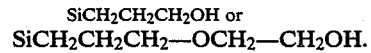

where a is 2 or 3; b is 0 or 1; c is 1 or 2; $b+c$ is 1 or 2 and $a+b+c$ is 4; $R°$ is Cl, Br, J or $OR^1$, where $R^1$ is an alkyl group with up to 4 C-atoms, an acyl group with up to 4 C-atoms, an alkoxy group with up to 6 C-atoms or H or another separating group that can be split off while forming an Si—O—Si bond; $R^2$ is an organic group with up to 8 C-atoms; and $R^3$ is a group of the formula

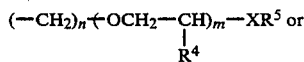

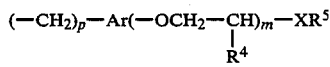

where $m=0$ to $30$; $n=1$ to $8$; $p=0$ to $9$; $R^4$ is H, $CH_3$ or $CH_2OH$; X is O, NH,

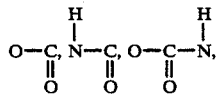

or S; and $R^5$ is an alkyl group with up to 18 C-atoms; an alkenyl group with up to 18 C-atoms; a hydroxyalkyl group with up to 18 C-atoms; an aryl group or H; or $XR^5$ is a cyanide or imidazoline group or a group that can be hydrolized to OH; and if $XR^5=SH$ and $m=0$, then $n=1$ to 3; and if $XR^5=NH_2$ and $m=0$, then $n=1$ to 6.

Other objects, advantages and novel features of the present invention will become apparent from the following detailed description of the invention.

DETAILED DESCRIPTION OF THE INVENTION

The general formula for the silicon-organic groups used in the anti-fogging treatment of glass windshields is discussed above.

$R°$ groups that react with the H-atoms of the superficial Si-OH groups are well known to the expert. These groups mainly include halogens, alkoxy and acyl groups. In particular, the groups preferred are methoxy, ethoxy and acetoxy groups. Despite very good chemical characteristics, the halogens such as Cl, are less preferable because of more difficult handling because of the hydrogen halides that are set free during the reaction.

During the treatment of the windows with the silicon-organic compounds, the R° groups thus completely or partly transform into the corresponding alcohols, organic or inorganic acids, while the remainder of the silicon-organic compound is chemically bonded with the glass via an oxygen bridge. This results in an extremely adhesive layer of the silicon-organic compound on the glass.

Occasionally, it is not possible to obtain sufficiently stable compounds where the $XR^5$ group is a free OH group. In these cases, it is advantageous to substitute the OH group in such a way that an OH group can be obtained easily by means of hydrolysis. For example, it is advantageous to use an iodine atom as the $XR^5$-group, instead of an OH-group. During treatment with water, the iodine atom is separated as hydrogen iodide and an OH-group is formed at the silicon-organic group. However, this type of a substituent must be selected such that a reaction does not take place with the OH-group of the glass.

The general formula for the silicon-organic groups used in the anti-fogging treatment of glass windshields is discussed above.

The production of the silicon-organic compounds is well known to the expert. Sometimes, these compounds even represent commercial products. Particularly suitable compounds are those of the following formulas:

$(CH_3O)_3Si-CH_2CH_2CH_2OH$, $(CH_3O)_3Si-CH_2-CH_2CN$, $(CH_3O)_3Si(CH_2)_3OCH_2CH_2OH$ or $(CH_3O)_3Si(CH_2)_3OCH(OH)CH_2OH$.

For the treatment of the vehicle windows, the silicon-organic compounds are dissolved or emulsified in a suitable solvent. Preferably, an aqueous solution is used, unless an easily hydrolizable group exists at the $R^2$ or $R^3$ group. The concentration of the silicon-organic compounds in a solvent, such as dichloromethane, should be about 2 to 10 percent in weight. Well-cleaned window glass is contacted with the solution containing the silicon-organic compound. Depending on the reactivity of the R° groups, the treatment may take up to several hours.

During this time, the functional R° groups react with the hydrogen atoms of the superficial Si—OH groups of the glass which results in a separating of R°H, and simultaneously results in an Si-O-Si bond between the glass surface and the silicon-organic compound. As a result, silicon-organic layers are formed that are connected with the base by means of principal valencies, and thus, are extremely durable anchored on the window surface.

However, it should be noted that the layer that is generated by the window by means of the treatment with the silicon-organic compound does not necessarily have to be monomolecular. Thicker hydrosilicon layers may also be formed at the glass surface that are the result of reactions with the water that is present on the glass surface. These water molecules, via hydrogen bridge bonding, permit a reversible opening and new formation of oxygen bridges. It is also possible that not all R° groups react with the SiOH group of the glass, but that also individual unreacted R° groups remain at the molecule or are hydrolized while forming an OH group. The possibility also exists that individual silicon-organic compounds react further with silicon-organic groups that are already located at the glass surface and as a result form thicker layers; for example, R° groups can react with $XR^5$ groups, if these, for example, represent OH or $NH_2$. In addition, there are frequently excess parts of the silicon-organic compound that purely mechanically still adhere to the window glass.

Because of the large number of the above-mentioned substances that are contemplated for the fogging layer, the selection of the effective coating should always be optimized for the concrete condensation.

For the effectiveness of the coating as an anti-fogging agent, a good tolerance for the fogging condensation is required.

Since the coating preferably takes place by means of the immersion process, it may be useful for the exterior side of the windshield to be exposed to the coating. This results in a better tolerance of the exterior glass surface with respect to organic substances such as exhaust gases and the rubber of the wipers. As a result, the much-feared hazing on the exterior of the windshield glass can be reduced.

The reaction of the silicon-organic compound with the glass surface takes place at a temperature as low as at room temperature. It is contemplated as advantageous to harden the anti-fogging layer at an increased temperature, in which case, the thermal stability of the layer and of the window must be taken into account, particularly in the case of a multilayer glass.

If the coating takes place during the manufacturing of the glass, the preliminary cleaning may largely be eliminated.

The following example is offered by way of illustration only and should not be construed as limiting the scope of the present invention in any way.

EXAMPLE

1. Cleaning

The used glass panes were degreased with acetone, and by means of a decontamination solution, were freed of traces of contamination that adhere to the surface. After a careful rinsing-off of the decontamination solution by means of distilled water, the window panes were dried for 30 minutes at 100° to 130° C.

2. Producing the Silicon-Organic Layer

The following coating steps (a) and (b) illustrate alternative coating steps which follow the cleaning:

(a) Coating of the pane with 2-cyano ethyl trimethoxysilane.

Two cleaned glass panes were immersed for 10 hours in a solution of 20 g of 2-cyano ethyl trimethoxysilane in 1,000 ml of dichloromethane. Subsequently, the panes were rinsed off with about 250 ml of dichloromethane, and were dried for about 30 minutes at 80° C.

(b) Treating the pane with 3-iodine propyl trimethoxysilane.

Two cleaned glass panes were coated with 3-iodine propyl trimethoxysilane. After the glass panes were rinsed off with dichloromethane, they were placed in distilled water at room temperature for 30 minutes for the purpose of hydrolysis. By this hydrolysis, the 3- iodine propyl trimethoxysilane is changed to 3-hydroxy propyl trimethoxysilane. Subsequently, the panes were then dried for 30 minutes at 100° to 130° C.

3. Application of Fogging Layer

The panes that had been coated with 2-cyano ethyl trimethoxysilane or with 3-hydroxy propyl trimethoxysilane and subsequently subjected to hydrolysis and uncoated panes which had been cleaned were placed in a fogging-measuring apparatus according to DIN 75 201 (German Bureau of Standards draft of April 1985), and were vaporized with di-2-ethylhexyl-phthalate (DOP). For this purpose, the DOP located at the bottom of the apparatus was heated to 100° C., and the glass pane, located at a distance of about 18 cm above the surface of the liquid, was exposed to the DOP vapors for three hours.

In the case of the untreated pane, the forming DOP-layer consisted of individual droplets of an average size of 6 to 10 um. No defined drop size could be determined in the case of the treated glass, and the fogging layer was largely disseminated. The quantity of the DOP that was vaporized on was about 150 mg per square meter.

4. Measuring of the Anti-Fogging Effect

For measuring the anti-fogging effect, the forming shine (reflectometer value in a spotlight with an angle of incidence of 60° at the normal line) was used. For the initial value, an untreated, unvaporized glass pane was used that had been cleaned according to DIN 75 201 (draft of April 1985) with prepared chalk. The shine value that occurs in the case of this pane was assumed to be 100%. The glass panes that were vaporized with DOP and treated with the silicon-organic compounds and, in comparison, glass panes that were untreated and vaporized with DOP were compared with this value.

A shine value of 100% thus corresponds to a completely translucent pane (clean, new window pane with a perfect surface) without any clouding at the surface that is caused by fogging.

A shine value of 0% corresponds to a material without any reflection, for example, to a black dim cloth.

5. Results

A glass pane on which, as described above, a anti-fogging layer was produced by means of 2-cyano ethyl trimethoxysilane after being vaporized with DOP, had a shine of 98%. An untreated glass pane that was vaporized under the same conditions with dioctyl phthalate exhibited a shine of only 30%.

The glass pane that, as described above, was treated with 3-iodine propyltrimethoxysilane for the production of the 3-hydroxy propyl trimethoxysilane layer, after being vaporized with DOP, still had a shine of 83%, whereas the untreated glass pane only had a shine of 29%.

Although the present invention has been described and illustrated by examples in detail, it is to be clearly understood that the same is by way of illustration and example only, and is not to be taken by way of limitation. The spirit and scope of the present invention are to be limited only by the terms of the appended claims.

What is claimed is:

1. A glass windshield assembly having an anti-fogging effect with respect to organic oily substances, comprising silicon-organic groups bonded to silicon atoms of the interior surface of the windshield via oxygen atoms, said silicon-organic groups having the following formula:

wherein:
 a. b represents 0 or 1,
 b. c represents 1 or 2,
 c. b+c is 1 or 2,
 d. $R^2$ represents an organic group containing up to 8 carbon atoms, and
 e. $R^3$ represents a group having one of the following formulas:

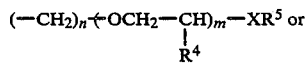

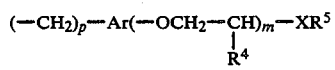

wherein:
 (1) m represents 0 to 30,
 (2) n represents 1 to 8,
 (3) p represents 0 to 9,
 (4) Ar represents aryl,
 (5) $R^4$ represents one of H, $CH_3$ or $CH_2OH$,
 (6) X represents one of O, NH,

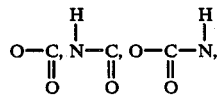

or S,
 (7) $R^5$ represents one of an alkyl group containing up to 18 carbon atoms, an alkenyl group containing up to 18 carbon atoms, a hydroxy alkyl group containing up to 18 carbon atoms, an aryl group or H, or
 (8) $XR^5$ represents a cyanide or imidizoline group, and if $XR^5$ is SH and m is 0, then n is 1 to 3, and if $XR^5$ is $NH_2$ and m is 0, then n is 1 to 6.

2. Windshield as in claim 1, wherein said silicon-organic group has the following formula:

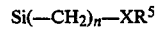

wherein:
 a. n represents 2 or 3,
 b. $XR^5$ represents one of CN, $NH_2$ or OH.

3. Windshield as in claim 2, wherein said silicon-organic group has one of the following formulas:

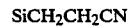

or

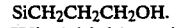

4. Windshield as in claim 1, wherein said silicon-organic group has one of the following formulas:

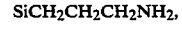

or

SiCH₂CH₂CH₂—OCH₂—CH₂OH.

5. Method of treating the interior surface of windshields having a glass surface to provide an anti-fogging effect with respect to organic oily substances, comprising contacting the glass surface with an amount of silicon-organic compound to impart fog resistant properties to the windshield, said silicon-organic compound having the following formula:

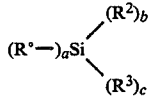

wherein:
a. a represents 2 or 3,
b. b represents 0 or 1,
c. c represents 1 or 2,
d. b+c is 1 or 2,
e. a+b+c is 4,
f. R⁰ is one of Cl, Br, I or OR¹, wherein R¹ represents one of an alkyl group containing up to 4 carbon atoms, an alkoxy group containing up to 6 carbon atoms, H or a given separating group which splits off while a Si—O—Si bond forms between the glass windshield and the silicon-organic compound applied thereto,
g. R² represents an organic group containing up to 8 carbon atoms, and
h. R³ represents a group having one of the formulas:

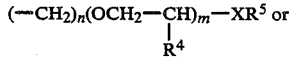

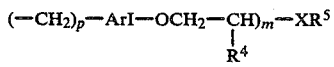

wherein:
(1) m represents 0 to 30,
(2) n represents 1 to 8,
(3) p represents 0 to 9,
(4) Ar represents aryl,
(5) R⁴ represents one of H, CH or CH₂OH,
(6) X represents one of O, NH,

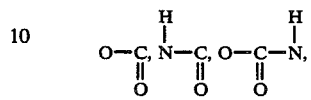

or S;
(7) R⁵ represents one of an alkyl group containing up to 18 carbon atoms, an alkenyl group containing up to 18 carbon atoms, a hydroxy alkyl group containing up to 18 carbon atoms, an aryl group or H, or
(8) XR⁵ represents a cyanide or imidizoline group, and if XR⁵ is SH and m is 0, then n is 1 to 3, and if XR⁵ is NH₂ and m is 0, then n is 1 to 6.

6. Method as in claim 5, wherein said applying of said silicon-organic compound includes using a silicon-organic compound having the following formula:

wherein:
a. a represents 2 or 3,
b. n represents 2 or 3,
c. R⁰ represents one of CH₃O, CH₃CH₂O, CH₃COO or Cl, and
d. XR⁵ represents one of CH, OH, NH₂ or I.

7. Method as in claim 5, wherein said contacting includes using the silicon-organic compound which is one of dissolved or emulsified in a solvent.

8. Method as in claim 7, wherein said contacting includes using an aqueous solution as the solvent.

9. Method as in claim 7, wherein said contacting includes using dichloromethane as the solvent and the silicon-organic compound is included in a concentration of about 2 to 10 percent in weight.

* * * * *